Nov. 1, 1938.  J. H. LIENAU ET AL  2,134,948
BULK STORAGE FOR GRANULAR MATERIALS
Filed Feb. 5, 1933  4 Sheets-Sheet 4
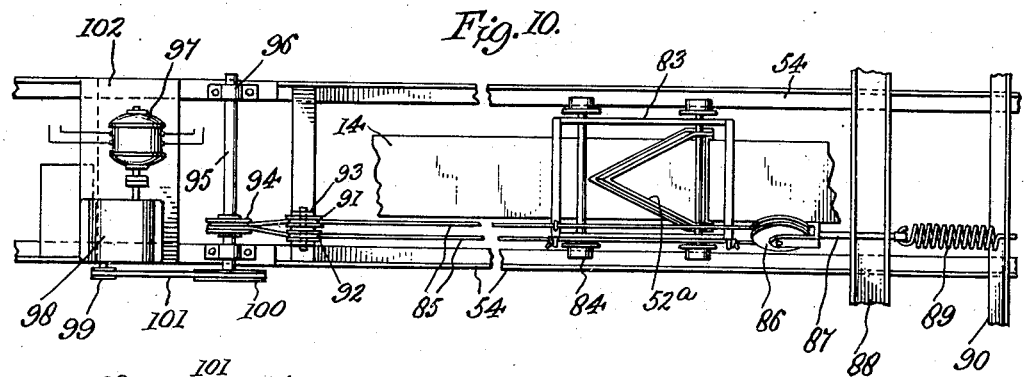
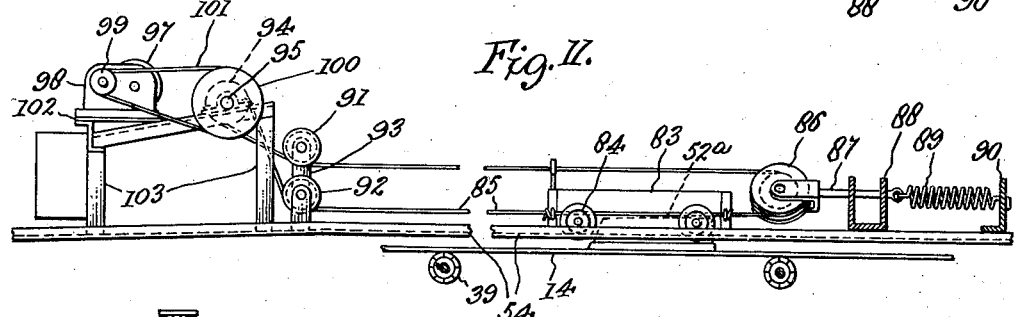
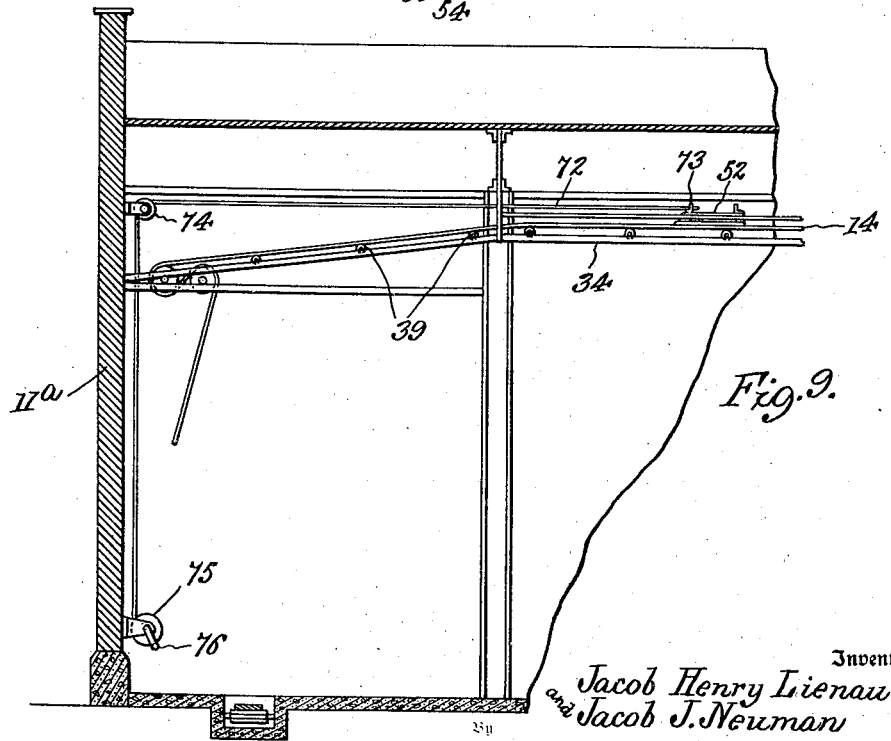
Inventors
Jacob Henry Lienau
and Jacob J. Neuman
C. P. Goepel
Attorney.

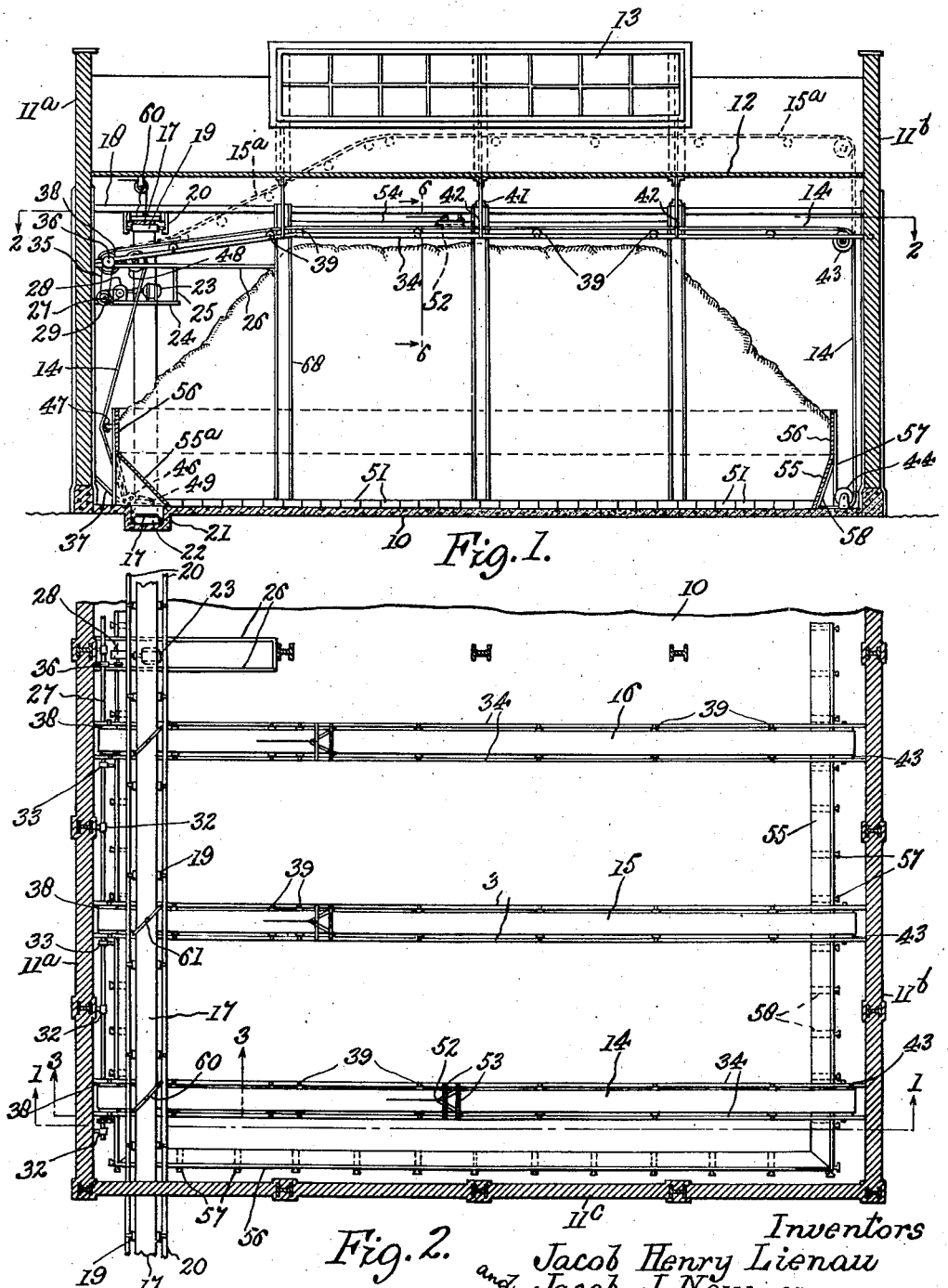

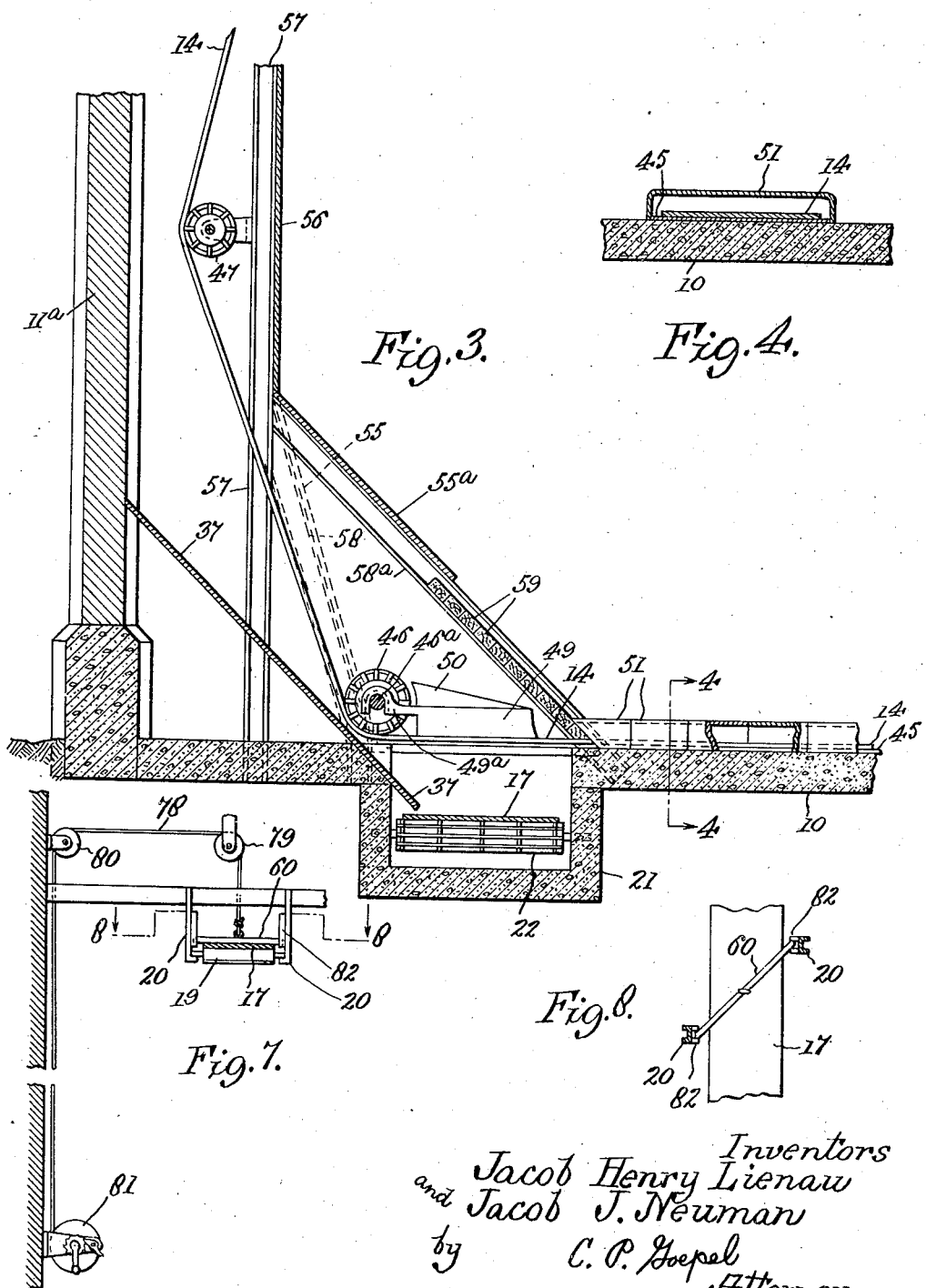

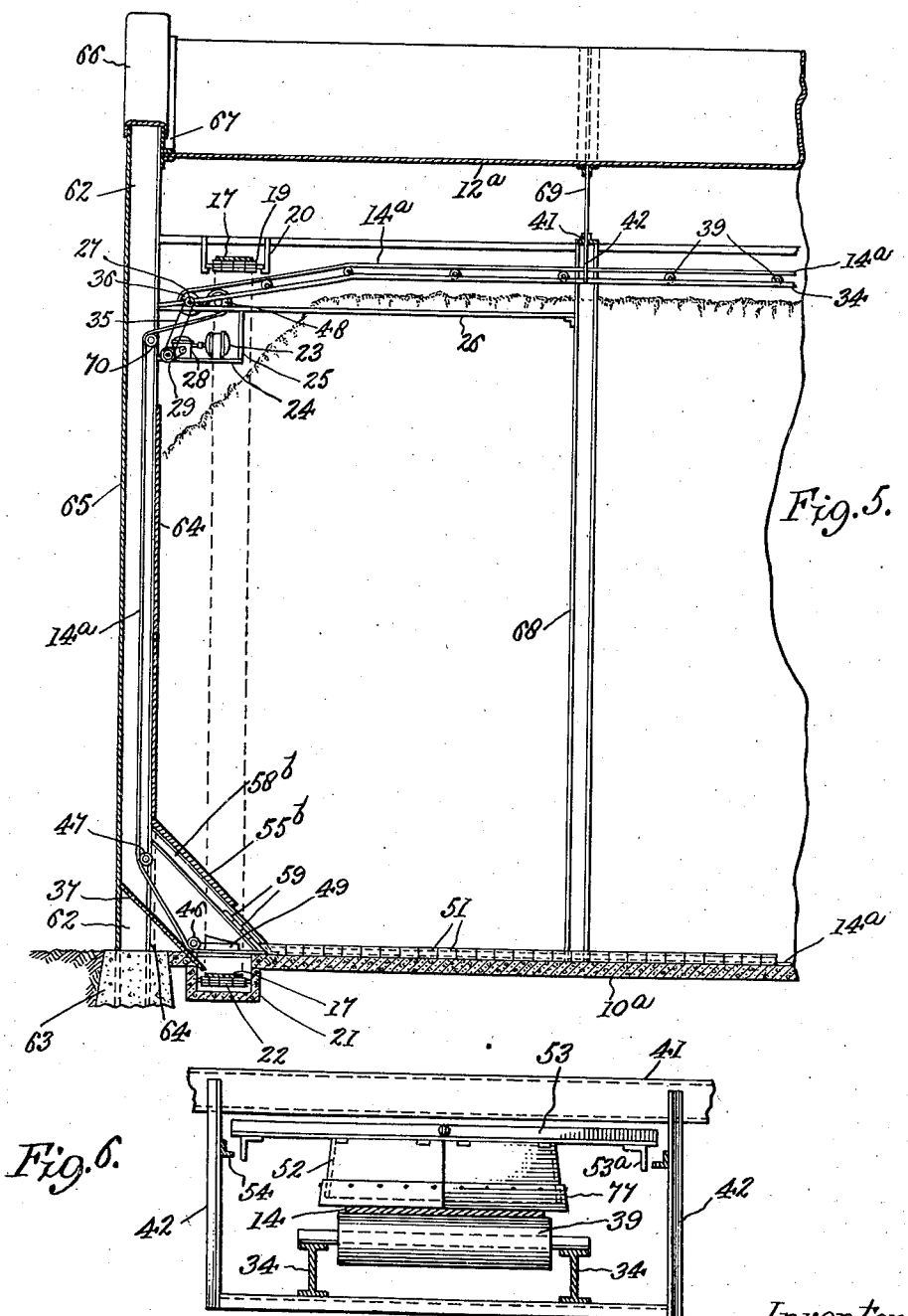

Patented Nov. 1, 1938

2,134,948

UNITED STATES PATENT OFFICE 2,134,948

BULK STORAGE FOR GRANULAR MATERIALS

Jacob Henry Lienau, New York, and Jacob J. Neuman, South Salem, N. Y.

Application February 5, 1938, Serial No. 188,870

11 Claims. (Cl. 214—16)

This invention relates to a bulk storage system for granular materials, and has for its general object and purpose to provide a system of conveyors and other equipment for converting the conventional type of warehouse into a bin for the bulk storage of granular materials, such as raw sugar or the like, and to do this with a minimum amount of changes to the warehouse and with a minimum addition of new equipment.

Another object of our invention is to so devise a system of conveyors and equipment that such system may be applicable to installation in a new warehouse of a type of construction more suitable to the bulk storage of granulated materials than the conventional types now in use.

With the foregoing objects and considerations in view, the invention consists in the improved system of conveyors and the relative arrangement of the several units thereof as applied to a conventional warehouse, and will be hereinafter more fully described and subsequently incorporated in the subjoined claims.

In the drawings, wherein similar reference characters designate corresponding parts throughout the several views—

Figure 1 is a vertical section of a warehouse taken on the line 1—1 of Fig. 2, showing the conveyors in elevation.

Figure 2 is a fragmentary horizontal section taken on the line 2—2 of Fig. 1 and showing the conveyors in top plan.

Figure 3 is an enlarged fragmentary sectional view taken on the line 3—3 of Fig. 2.

Figure 4 is a sectional view taken on the line 4—4 of Fig. 3.

Figure 5 is a fragmentary vertical sectional view, similar to Fig. 1, showing the system of conveyors as applied to a different type of warehouse construction.

Figure 6 is an enlarged fragmentary sectional view taken on the line 6—6 of Fig. 1.

Figure 7 is a fragmentary vertical sectional view of the longitudinal or main conveyor showing the manner of supporting the plows for movement to operative or inoperative position.

Figure 8 is a fragmentary sectional view taken on the line 8—8 of Fig. 7.

Figure 9 is an enlarged vertical sectional view similar to Fig. 5 with certain parts eliminated for facility of reference and showing the manner in which the plows on the lateral conveyors are adjusted for the purpose of evenly filling the warehouse.

Figure 10 is an enlarged fragmentary top plan of a modified form of lateral plow and operator therefor.

Figure 11 is a detail side elevation, partly broken away and partly in section, of the structure shown in Fig. 10.

Referring in detail to the drawings, and more especially to Figs. 1 to 4, we have shown, for the purpose of applying our invention, a conventional warehouse consisting of the concrete floor 10, and the brick walls 11a, 11b and 11c, with the steel truss supported roof having a skylight 13. Although in Fig. 2 there is only shown so much of the warehouse as embraces the three transverse conveyors 14, 15 and 16, and part of the loading and discharging conveyor 17, it is to be understood that the warehouse may be longer and there may be many more of these conveyors which all cooperate with the longitudinal conveyor 17 to fill or empty the available space in the warehouse. The conveyors 14, 15, 16 and 17 are of the endless belt type.

The conveyor 17 enters the warehouse through the wall 11c and runs along the roof 12 just below the beams 18 to the far wall as viewed in Fig. 1, and thence down along the far wall to the trench 21 and leaves the warehouse at the base of the wall 11c. On its upper run the conveyor belt 17 runs on the idlers 19, supported by bracket or supporting members 20 fastened to the beams 18. On its lower run the belt 17 runs on the idlers 22 journalled in the trench 21.

The conveyors 14, 15 and 16 are also of the same endless belt type and are alike one to the other, except that the center conveyor 15 may be extended up to the peak of the roof 12, as indicated by the broken lines 15a for the purpose of increasing the storage capacity by allowing the material to be piled up closely under the roof 12. The conveyors 14, 15 and 16 may each have a separate drive, but it is possible to drive them through clutches from line shafting with a single motor, and for purposes of simplicity this type of drive has been illustrated. The motor 23 is supported on the platform 24 which is suspended by the bracket members 25 from the beams 26, and drives the line shaft 27 through a suitable reduction drive such as the speed reducer 28, and the chain and sprocket drive 29. The shafting 27 is supported by bearings 32 on the wall 11a and has the clutches 33 at points opposite each of the conveyors 14, 15 and 16. Chain drives 35 are connected to each of the clutches 33 and drive the head pulleys 36 of each of the conveyors 14, 15 and 16. Since the conveyors 14, 15 and 16 are essentially the same, it will suffice to describe the construction of the conveyor 14, this description also applying to the conveyors 15 and 16.

The conveyor belt 14 passes around a driving or head pulley 38 and over the idlers 39, which are supported on the bracket or supporting members 34 hung from the lower chords 41 of the roof trusses by the hangers 42. The idlers are of the same slatted construction as those disclosed in Patent No. 2,023,611. After crossing the warehouse, the conveyor belt 14 passes around the upper idler 43 and down to the floor 10 near the wall 11b, and thence around the lower idler 44 which is rotatably supported by and close to the floor 10. The belt 14 now passes horizontally across the warehouse directly on the floor 10, if it is smooth, or the floor 10 may have a thin steel plate 45 thereon to provide a smooth surface for the belt 14 to ride on. The belt 14 then passes over the open top of the trench 21 containing the conveyor belt 17, and thence around the idlers 46, 47 and 48 back to the driving pulley 38.

The purpose of the pulley or idler 48, which has the axis thereof in substantially the same horizontal plane as the axis of the pulley 38, is to give the belt 14 a greater wrap or area of contact with the driving pulley 38, so as to provide sufficient traction to drive the belt 14. The pulley 48 may also be used as a take-up pulley to compensate for stretch in the belt 14, and for this purpose may be mounted for adjustment toward or away from the pulley 38.

On its lower or horizontal run across the floor 10, the belt 14 is covered by a sectional U-shaped or channelled housing 51 forming a tunnel through which the belt 14 passes when the bin is being filled with sugar. The housing sections 51 engage the opposite sides of the plate 45 which holds the housing sections 51 against lateral movement.

A V-shaped plow 49 rests on the belt 14 directly over the trench 21 containing the belt 17, and discharges the material from the belt 14 onto the belt 17 when the bin is being emptied. The plow 49 is retained in operative position on the belt 14 by means of hook-shaped arms 49a which detachably engage over the shaft 46a for the pulley 46. The belt 17 carries the sugar through the wall 11c and out of the warehouse where it may be transferred to another conveyor or other means which will remove the material to the desired location.

The idler 46 is placed at the very edge of the trench 21 so that any material not removed from the belt 14 by the plow 49, and loosened by the idler 46 will fall into the trench 21. A plate 37 extending from the wall 11a to just above the belt 17 is provided to direct any material falling thereon from the belt 14 or the idler 47 onto the belt 17. The plow 49 is constructed with a slanting roof 50 which allows any material, such as material thrown off by the idler 46, to slide off onto the conveyor belt 17 instead of back onto the belt 14.

When the material is being fed into the bin, it comes in on the top run of the conveyor belt 17 and is plowed onto the top run of the belt 14 by a selected plow 60. At the proper or selected point on the belt 14, the material is discharged by another plow 52 which has the transverse members 53 fastened thereto provided with angle members 53a engageable with the guides or angle members 54 supported by the hangers 42 so as to hold the plow 52 on the conveyer 14 against undue lateral movement. As it is desired to shift the discharge point of the belt 14, the plow 52 is moved along the angle members 54 which guide and support the plow 52 at predetermined points along the belt 14. In this manner the material may be discharged, as an example, at the far side of the bin initially and the plow 52 may be gradually or periodically moved forward toward the loading or main belt 17.

In Fig. 9 there is shown one means for adjusting the position of the plow 52 relative to the length of this belt 14. As here shown, one end of a cable or flexible member 72 is secured as at 73 to the plow 52, and the cable 72 is trained over a pulley 74 secured to the wall 11a, and is then brought down to a winding drum 75 having a crank 76 by means of which the cable 72 may be wound or unwound manually from the drum 75.

As is shown in Fig. 6, the plow 52 frictionally contacts at its lower edge with the upper surface of the conveyor 14, and in order to provide a means whereby the conveyor 14 will not be unduly injured through contact with the plow 52, we have provided a flexible edging or extension 77 which engages about the opposite sides of the plow 52 and extends downwardly therefrom a slight distance so that the metal of the plow 52 will be held out of contact with the belt 14. This flexible edging 77 is preferably detachably secured to the sides of the plow 52 so that when occasion demands this edging or extension 77 may be replaced.

In Figs. 7 and 8 we have shown one of the plows 60 and the operating means whereby a selected plow 60 may be raised from or lowered to the conveyor 17 and thus discharge the material from the loading conveyor 17 onto the selected lateral or transverse conveyor 14. As is here shown the plow 60 has secured thereto one end of a cable or flexible member 78 which is trained over pulleys 79 and 80 and is then brought down to and wound about a winding drum 81 secured to the wall 11a at a convenient position for manual operation. The ends of the plow 60 engage in vertical guides 82 carried by the brackets or supports 20, as is clearly shown in Fig. 8, so that each plow 60 will be supported for vertical sliding movement toward or away from the conveyor 17 and with each plow 60 being disposed on an oblique angle to the length and movement of the conveyor 17.

In Figs. 10 and 11 there is shown a modified form of operating and adjusting means whereby the material on a lateral or transverse conveyor 14 may be discharged therefrom into the bin by means which will gradually move the plow longitudinally of the conveyor 14. A plow 52a, similar to a plow 52, is secured to a carriage 83 having wheels 84 which engage the angle bars 54, and an endless cable 85 is secured on one run thereof to this carriage 83. The cable 85 is trained over an end pulley 86 which is provided with a shank 87 slidably engaging a guide member 88, and a spring 89 has one end thereof secured to the shank 7 and the opposite end to an angle bar 90 extending between the guide members 54.

The opposite runs of the cable 85 pass beneath a pair of idler pulleys 91 and 92 carried by an upstanding bracket 93 secured to the guide members 54, and after passing beneath the pulleys 91 and 92 the cable 85 is wound about a drum 94 which is fast on a shaft 95 rotatably carried by bearings 96. The shaft 95 is driven by means of a reversible motor 97 which is connected to a reduction gearing or transmission 98, and the gearing or transmission 98 is provided with a pulley 99. A pulley 100 is secured to the shaft 95 and a belt 101 is trained over the pulleys 99 and 100 so that the shaft 95 will be rotated in a predetermined direction by the motor 97. It will, of course, be obvious that a reversing transmission may be substituted for a reversing motor. The motor 97 and the transmission 98 is supported on a platform 102 carried by a frame structure 103 secured to the guide members 54. The controlling means for the motor 97, such as a reversing switch (not shown) may be extended to a suitable and convenient point remote from the motor 97 so that a workman may readily control the discharge of the material from the conveyor 14 upon which the material is being discharged by a selected plow 60.

The walls of the bin are constructed of heavy sheet steel and have the slanted portion 55 forming the lower half and the vertical section 56 forming the upper half. The supports consist of the vertical members 57 and the slanting member 58 which are both embedded and anchored in the floor 10. The slanting member 58 is anchored in the floor on the side of the trench 21 nearest to the wall 11a. At the conveyors 14, 15 and 16, the upper or vertical section 56 remains the same, but the slanting members 58a meet the floor on the side of the trench furthest from the wall 11a. The slanted wall 55a extends about halfway down the slanting members 58a at these points, the remainder being formed by the planks 59 supported by the flanges of the members 58a. The planks 59 merely lay on the flanges of the members 58a and are not fastened thereto, as they must be removed when the bin is to be discharged. These planks 59 are removed by a workman entering the bin and lifting them off from the supporting members 58a.

In operation, where it is desired to fill the bin, the planks 59 are placed in position on the flanges of the supporting members 58a, and all the plates 51 are placed in position over the lower runs of the transverse conveyor belts such as the belts 14, 15 and 16. The sugar is now conveyed into the warehouse on the top run of the conveyor belt 17 and removed by the plow 60 onto one of the transverse belts, such as the belt 14, the clutches 33 for the other conveyors being released so that only the conveyors 17 and 14 operate. The plow 52 is positioned at one end of the plow supporting and guiding members 54 until the material piling up on the floor 10 of the warehouse reaches a point near the top of the vertical section 56 of the retaining wall. The plow 52 is now moved gradually toward the opposite wall of the warehouse until the material is piled up near the top of the vertical retaining wall section 56 of this wall also. The position or adjustment of the plow 52 may be effected manually through the drum 75 shown in Fig. 9, or by the motor 97 and the associated parts shown in Figs. 10 and 11.

When sufficient material has been discharged beneath the conveyor 14, the operation of this conveyor may be stopped and the clutch for the conveyor belt 15 engaged, starting this belt 15. A plow 61, similar to plow 60, is associated with the belt 15 and with the belt 15 moving the plow 60 is raised by means of the elevating means 78 and 81 out of contact with the belt 17, and the clutch 33 for the belt 14 is disengaged, thus stopping the movement of the belt 14. The material now passes beyond the belt 14 to the plow 61 and is discharged thereby onto the conveyor 15. This is continued until the section of the bin under the conveyor 15 is filled and the procedure is repeated for the belt 16 and any other belts which may be used until the bin is full.

When it is desired to empty the bin, the operator slides up some of the planks 59 which allows the material adjacent the belt 17 to feed down onto the lower run of the belt 17 which carries it out of the warehouse. The transverse belt 14 is not started until all of the planks 59 have been removed and as much of the material as will feed to the lower run of the belt 17 by gravity has been conveyed away. The operator now starts the conveyor belt 14 and removes the sections of the plates 51 covering the lower run of the belt 14 one at a time, thus allowing the material to feed down onto the belt 14 and be conveyed to the plow 49 which discharges it onto the lower run of the belt 17. This is continued until all the material is removed from this section and then repeated at the belts 15 and 16.

The remainder of the materials which will not feed onto the belts 14, 15 and 16 by gravity must be shovelled onto such belts, or may be plowed on by a tractor with a plow mounted thereon. In practice the belts 14, 15 and 16 are relatively close together so that only a small percentage of the capacity of the bin must be removed in this manner, and since the warehouse may be completely emptied only once or twice a year this is no great disadvantage considering the extra storage space gained and the money saved by not building sloping walls all around the bin. It is the bracing of these sloping walls which makes the conventional bin expensive. Also even when sloping walls are used, it is necessary to shovel sugar in order to completely discharge the bin, as the sugar often packs and clings to the walls, especially in large bins where the pressures are high.

It might be thought that in the case where there is no existing warehouse in which to apply the invention, as in the case of a new installation, that it could not successfully compete with the conventional type of bin or with bag storage on an economic basis. It must, however, be remembered that the conventional bin also requires a warehouse to house it. Furthermore, still greater economies of storage space may be arrived at, in addition to those of the above described embodiment of the invention, by designing the walls of the warehouse to take horizontal stress, and in Figure 5 we have shown the system of conveyors as applied to a warehouse of this type.

The bin retaining walls 55 and 56 illustrated in Figures 1 to 3 are no longer necessary and the material rests directly against the walls of the warehouse itself. In the embodiment illustrated in Figure 5 the walls consist of a series of vertical steel column members 62 which are firmly anchored in the foundations 63, said columns 62 being so designed as to be capable of withstanding the horizontal pressure of the material without additional support. The inside or retaining surface 64 is constructed of sheet steel which may be fairly light near the top and increasingly heavy nearer to the floor 10a, and is secured to the columns 62 by conventional means. The retaining walls 64 need only extend to such an elevation on the columns 62 as the material stored will reach. The outer wall surface 65 is also fastened to the columns 62 and is of a light weatherproof construction, extending all the way to the coping 66 which caps the columns 62. A flashing 67 extends on the inside of the columns 62 from the coping down to the roof surface 12a.

The floor 10a of the warehouse, shown in Fig. 5, is of standard concrete construction, and the roof 12a is supported by the columns 68 and the trusses 69 conforming to conventional methods of design. The retaining walls 64 extend vertically from the floor 10a except at the location of the transverse conveyors, such as the conveyor 14a which is similar to the conveyor 14 shown in Figures 1 to 4, except that on its vertical runs it travels in back of the retaining wall 64 between two of the columns 62. An additional idler 70 is provided at the top of said vertical runs of the conveyor 14a and is supported by the columns 62. At the location of the conveyor 14a inclined members 58b support the retaining surface 55b the same as in the embodiment previously described. The drive for the conveyor 14a, the methods of loading and unloading it from and to the conveyor 17 and other details of construction are the same as for the conveyor 14, the same character of reference applying throughout except as noted above.

It will be seen that by the elimination of the bin retaining walls 55 and 56, which were necessary when applying the invention to a conventional warehouse, that considerable additional storage capacity is available since there is no waste space such as existed between the walls 55 and 56, and the wall 11a, furthermore, the material may be piled much higher. Although the cost of the walls 64 with the columns 62 is greater than the cost of the conventional walls 11a, this difference is offset due to the fact that the retaining walls 55 and 56 are now eliminated.

Also, as herein disclosed, it will be appreciated that our purpose is accomplished by means of simple and inexpensive apparatus which will be highly reliable in the performance of its functions and require little care or attention in order to maintain the same at its highest operating efficiency.

It will, however, be understood that the illustrated embodiment of the apparatus is more or less suggestion, and that insofar as the essential novel features of such apparatus are concerned, the same might be exemplified in various other structural forms. Therefore, it is to be understood that we reserve the privilege of adopting all such legitimate changes in the form, construction and relative arrangement of the various parts of the apparatus as may be fairly considered within the spirit and scope of the invention as claimed.

What is claimed is:

1. A means for filling and emptying a storage space, comprising a combined loading and discharging endless conveyor, means supporting one run of said conveyor in an elevated position adjacent the upper portion of said storage space, means supporting the lower run of said conveyor adjacent the bottom of said storage space, said upper run comprising the loading portion of said conveyor, said lower run comprising the discharging portion of said conveyor, a second conveyor disposed at right angles to said first conveyor, said second conveyor having the upper run thereof extending laterally of the upper run of said first conveyor and the lower run thereof extending laterally of the lower run of said first conveyor, means discharging material from the upper run of said first conveyor onto the upper run of said second conveyor, and means discharging the material from the upper run of said second conveyor into said storage space.

2. A means for filling and emptying a storage space comprising a combined loading and discharging endless conveyor, means supporting one run of said conveyor in an elevated position adjacent the upper portion of said storage space, means supporting the lower run of said conveyor adjacent the bottom of said storage space, said upper run comprising the loading portion of said conveyor, said lower run comprising the discharging portion of said conveyor, a second conveyor disposed at right angles to said first conveyor, said second conveyor having the upper run thereof extending laterally of the upper run of said first conveyor and the lower run thereof extending laterally of the lower run of said first conveyor, means discharging material from the upper run of said first conveyor onto the upper run of said second conveyor, means discharging the material from the upper run of said second conveyor into said storage space, and means for moving said latter discharging means longitudinally of said second conveyor.

3. A means for filling and emptying a storage space comprising a combined loading and discharging endless conveyor, means supporting one run of said conveyor in an elevated position adjacent the upper portion of said storage space, means supporting the lower run of said conveyor adjacent the bottom of said storage space, said upper run comprising the loading portion of said conveyor, said lower run comprising the discharging portion of said conveyor, said second conveyor having the upper run thereof extending laterally of the upper run of said first conveyor and the lower run thereof extending laterally of the lower run of said first conveyor, means discharging material from the upper run of said first conveyor onto the upper run of said second conveyor, means discharging the material from the upper run of said second conveyor into said storage space, a sectional cover removably engaging over the lower run of said second conveyor, and means for discharging the material on the lower run of said second conveyor onto the lower run of said first conveyor.

4. A means for filling and emptying a storage space comprising right angularly related endless conveyor belts, means supporting the upper runs of said belts adjacent the upper portion of said storage space, means supporting the lower runs of said belts adjacent the lower portion of said storage space, means engageable with the upper run of one of said belts for discharging material onto the upper run of a right angularly related belt, and means supporting said discharging means for movement toward or away from said one belt.

5. A means for filling and emptying a storage space comprising right angularly related endless conveyor belts, means supporting the upper runs of said belts adjacent the upper portion of said storage space, means supporting the lower runs of said belts adjacent the lower portion of said storage space, means for discharging the material from the upper run of one of said belts to the upper run of another belt, means discharging the material from the upper run of said other belt into the storage space, and means discharging the material from the lower run of said other belt onto the lower run of said one belt.

6. A means for filling and emptying a storage space comprising right angularly related endless conveyor belts, means supporting the upper runs of said belts adjacent the upper portion of said storage space, means supporting the lower runs of said belts adjacent the lower portion of said storage space, means engageable with the upper run of one of said belts for discharging the material thereon onto the upper run of another or right angularly related belt, a discharging means engaging said other belt, means supporting said latter discharging means for movement longitudinally of said other belt, and means for moving said latter discharging means longitudinally of said other belt.

7. A means for filling and emptying a storage space comprising right angularly related endless conveyor belts, means supporting the upper runs of said belts adjacent the upper portion of said storage space, means supporting the lower runs of said belts adjacent the lower portion of said storage space, means engageable with the upper run of one of said belts for discharging the material thereon onto the upper run of another or right angularly related belt, a second discharging means engaging said other belt, means for moving said second discharging means longitudinally of said other belt, a cover in the lower portion of said storage space enclosing the lower run of said other belt and removably engaging thereover, and means engaging the lower run of said other belt for discharging the material thereon onto the lower run of said first belt.

8. In a warehouse, an inner retaining wall disposed in spaced relation to a wall of the warehouse, a loading and discharging conveyor extending longitudinally of said retaining wall, means supporting the upper run of said conveyor adjacent the upper portion of said retaining wall, means supporting the lower run of said conveyor adjacent the lower portion of said retaining wall, a plurality of lateral conveyors extending from said first conveyor and each having the upper run thereof extending from the upper run of said first conveyor and the lower run thereof extending from the lower run of said first conveyor, a plow associated with each lateral conveyor and engaging the upper run of said first conveyor, means supporting said plows for movement into contact with said first conveyor or out of contact with said first conveyor, a plow engaging the upper run of each lateral conveyor for discharging the material into the interior of the warehouse, and means for moving said latter plows longitudinally of said lateral conveyors.

9. In a warehouse, an inner retaining wall disposed in spaced relation to a wall of the warehouse, a loading and discharging conveyor extending longitudinally of said retaining wall, means supporting the upper run of said conveyor adjacent the upper portion of said retaining wall, an inclined wall structure extending inwardly and downwardly of said retaining wall and engaging over the lower run of said conveyor, a plurality of lateral conveyors having upper runs extending from said first conveyor and having lower runs movable toward the lower run of said first conveyor, cover means removably supported by the warehouse floor and disposed over the lower runs of said lateral conveyors, means discharging the material from the upper run of said first conveyor onto the upper runs of said lateral conveyors, means discharging the material from the upper runs of said lateral conveyors, and means discharging the material from the lower runs of said lateral conveyors onto the lower run of said first conveyor.

10. A means for filling and emptying a storage space comprising a combined loading and discharging conveyor, means supporting said conveyor with the upper run thereof adjacent the upper portion of the storage space, means supporting the lower run of said conveyor adjacent the lower portion of the storage space, a plurality of right angularly related conveyors having the upper runs thereof movable away from the upper run of said first conveyor and the lower runs thereof movable toward the lower run of said first conveyor, a discharging means for each right angularly related conveyor engageable with the upper run of said first conveyor, and selective operating means for said discharging means whereby the material from said first conveyor may be discharging into a selected right angularly related conveyor.

11. A combined warehouse and storage bin for granular material comprising a housing having upright walls, a combined loading and discharging conveyor having the upper run thereof disposed adjacent the upper portion of one of said upright walls and the lower run disposed adjacent the lower portion of said one upright wall, a plurality of lateral conveyors supported within said housing having upper runs leading from the upper run of said first conveyor and lower runs leading to the lower run of said first conveyor, means for discharging the material from the upper run of said first conveyor onto the upper runs of said lateral conveyors, and means for discharging the material from said lateral conveyors into said housing.

JACOB HENRY LIENAU.
JACOB J. NEUMAN.